(12) United States Patent
Park et al.

(10) Patent No.: US 8,491,230 B2
(45) Date of Patent: Jul. 23, 2013

(54) CLAMPING DEVICE FOR A CUTTING INSERT

(75) Inventors: Hong Sik Park, Daegu (KR);
Ho-Hyoun Cho, Daegu (KR)

(73) Assignee: TaeguTec, Ltd., Dalsung-gun, Daegu (KR)

( * ) Notice: Subject to any disclaimer, the term of this patent is extended or adjusted under 35 U.S.C. 154(b) by 431 days.

(21) Appl. No.: 12/672,778

(22) PCT Filed: Aug. 10, 2007

(86) PCT No.: PCT/KR2007/003855
§ 371 (c)(1),
(2), (4) Date: Mar. 18, 2011

(87) PCT Pub. No.: WO2009/022757
PCT Pub. Date: Feb. 19, 2009

(65) Prior Publication Data
US 2011/0164933 A1    Jul. 7, 2011

(51) Int. Cl.
*B23B 27/04* (2006.01)
(52) U.S. Cl.
USPC .......................... 407/103; 407/102; 407/104
(58) Field of Classification Search
USPC .................. 407/102, 103, 104, 105.107, 108
See application file for complete search history.

(56) References Cited

U.S. PATENT DOCUMENTS

| | | | |
|---|---|---|---|
| 4,480,950 A | 11/1984 | Kraft et al. | |
| 5,100,268 A | * 3/1992 | Nakayama et al. | 407/104 |
| 5,685,672 A | 11/1997 | Tjernstrom | |
| 5,820,311 A | * 10/1998 | Grun et al. | 407/102 |

(Continued)

FOREIGN PATENT DOCUMENTS

| | | |
|---|---|---|
| JP | 60-114403 | 6/1985 |
| JP | 09-192908 | 7/1997 |
| KR | 10-2004-0075162 | 8/2004 |

OTHER PUBLICATIONS

International Search Report in PCT/KR2007/003855, dated May 8, 2008.
Written Opinion in PCT/KR2007/003855, dated May 8, 2008.

(Continued)

*Primary Examiner* — Will Fridie, Jr.
(74) *Attorney, Agent, or Firm* — Womble Carlyle

(57) ABSTRACT

An insert clamp secures a cutting insert having a central hole to a tool holder. The clamp includes a forward protrusion to be received in the central hole of the insert, a central body portion provided with a pressing part to press down the upper surface of the insert and a screw hole for a clamping screw to pass through, and a rear protrusion having a rear contact surface to come in contact with a rearward slanting surface of the tool holder. The forward protrusion is formed on the forward end of the insert clamp, an inside surface of the forward protrusion extends downward in a spaced state apart from the inner wall of the central hole of the insert, and a distal portion of the inside surface the forward protrusion is provided with a protuberance of convex curved surface to come in tangential contact with the inner wall of the insert. The pressing part is formed on the bottom surface of the central body portion of the insert clamp, and has convex curved surfaces to come in tangential contact with the upper surface of the insert on both regions of the bottom surface of the central body portion which is bisected by a central line passing through the forward protrusion and the screw hole.

8 Claims, 7 Drawing Sheets

U.S. PATENT DOCUMENTS

| | | | | |
|---|---|---|---|---|
| 5,944,457 A | * | 8/1999 | Tjernstrom | 407/105 |
| 6,146,062 A | | 11/2000 | Jansson | |
| 6,609,859 B1 | * | 8/2003 | Sjoo | 407/103 |
| 6,702,528 B2 | * | 3/2004 | Jansson | 407/102 |
| 7,195,427 B2 | * | 3/2007 | Sjoo et al. | 407/82 |

OTHER PUBLICATIONS

Official Action dated May 31, 2012 issued in Chinese counterpart application (No. 200780100202.1) with translation.

* cited by examiner

CLAMPING DEVICE FOR A CUTTING INSERT

TECHNICAL FIELD

The present invention relates to a device clamping a cutting insert to a tool holder. A tool holder of this kind is particularly useful for an indexable insert with a central hole to be secured in a mounting seat of the tool holder.

BACKGROUND ART

An indexable inserts is mounted on a cutting tool holder for machining a workpiece and may take various shapes such as square and triangle with an equal corner angle all around the insert, or rhombic or rhomboidic shapes with acute nose point angles.

In general, a machining tool mounted with this indexable insert is used for drilling, milling, and turning. In these various machining methods, the cutting insert is secured onto the seat of the tool holder by a clamping means and provides a cutting edge to contact the workpiece.

A clamping means to secure an insert with a central hole to a tool holder has been disclosed in EP 0759826 B1. This clamping means intends to keep the insert in place in the pocket so that the clamping force is acting on both the top surface and in the central hole wall of the insert without any tendency of coming apart from its underneath supporting surface of the seat of the tool holder. And the rear end portion of this clamp is adapted to come into abutment with an inclined rear surface provided on the holder body.

However, this clamp is characterized by a point contact between the hole wall of the insert and the front clamp projection at a point distantly provided from the top surface of the insert by means of arranging a forward protrusion having an axis of symmetry that is oriented at an inclined angle($\beta$) relative to the axis of the hole. In this clamping structure, the contact point pressing the hole wall has only an infinitesimal area. Accordingly, when the cutting tool is used for a prolonged period of time, the contact point is susceptible to wearing and the clamp is got loosened. Hence, there has been a concern that the clamping becomes too loose for an appropriate cutting operation if the clamp is not tightened further once in a while.

Also, with the above insert, the flat underneath surface is not guaranteed to achieve a flat surface abutment against the top surface of the insert. In other words, as the contact position of the end surface of the rear protrusion on the inclined contact surface is varied depending on the manufacturing variations of inserts or clamps, the contact between the flat underneath surface and the top surface of the insert may not be an actual planar contact, but may result in a point contact at a forward border position "A" or a rearward border position "B" of the flat surface as illustrated in FIG. 6. If this is the case, the contact point is also susceptible for wearing and the clamping gets loosened under a prolonged use of the tool. Especially, when the contact is made at a forward border position "A", a force lifting the rear portion of the insert apart from the bottom face of the insert pocket due to a shear force applied on the insert nose is not effectively counteracted, and an ultimate insert failure may result. Also, since shear force is mainly applied on one active edge of the two edges adjacent to the nose, there is a tendency of lifting a portion of the insert opposite to the active edge apart from the bottom face of the insert pocket. However, the aforesaid clamp is inefficient for suppressing this tendency, and this becomes more problematical if the insert is in triangular shape where there is only one upstanding support surface of the insert pocket.

On the other hand, in Korean registered patent no. 0450439, the inventor proposed a contact structure, in which a contact portion formed on the inner side of the forward protrusion has a surface contact over a certain length with the inner wall of the central hole of an insert so that wearing is reduced. Also, pressing portions of flat surface are provided on both flanks of the forward protrusion to press down the insert.

However, in this structure, as the end surface of the rear protrusion is displaced on the inclined contact surface, a smooth surface contact is not achieved between the contact portion and the inner wall of the central hole but a point contact may occur at a top position "C" or a bottom position "D" as illustrated in FIG. 7. In this case, the contact point is also susceptible for wearing and the clamping gets loosened under a prolonged use of the tool. Especially, when the contact is made at a top position "D" the contact point is so close to the upper surface of the insert that the support point for transverse clamping force becomes unstable. Also, since pressing points are made around flank rim of the central hole, the force to counteract a force lifting the rear portion of the insert apart from the bottom face of the insert pocket due to a shear force applied on the insert nose is not sufficient and insert failure may occur ultimately.

SUMMARY OF THE INVENTION

The present invention has been conceived to solve the aforementioned problems of clamping failure due to contact point wearing and a severe displacement of contact points in the prior art, and accordingly an object of the present invention is to provide an insert clamp with a simple structure to clamp a cutting insert to a tool holder securely and stably.

According to the present invention, there is provided an insert clamp for securing a cutting insert to a tool holder, the cutting insert having a central hole with its axis perpendicular to an upper surface, comprising: a forward protrusion to be received in the central hole of the insert, a central body portion provided with a pressing part to press down the upper surface of the insert and a screw hole for a clamping screw to pass through, and a rear protrusion having a rear contact surface to come in contact with a rearward slanting surface of the tool holder; wherein the forward protrusion is formed on the forward end of the insert clamp, an inside surface of the forward protrusion extends downward in a spaced state apart from the inner wall of the central hole of the insert, and a distal portion of the inside surface the forward protrusion is provided with a protuberance of convex curved surface to come in tangential contact with the inner wall of the insert; and the pressing part is formed on the bottom surface of the central body portion of the insert clamp, and has convex curved surfaces to come in tangential contact with the upper surface of the insert on both regions of the bottom surface of the central body portion which is bisected by a central line passing through the forward protrusion and the screw hole.

According to a feature of the present invention, the pressing part is a pair of protuberances in hemispherical shape separated by a length spanning across the central line inside the upper surface area of the insert.

According to a feature of the present invention, a line joining the pair of protuberances is perpendicular to the central line and is separated rearward from the forward protrusion.

According to another feature of the present invention, the pressing part is a protuberance in an elongated hemi-cylindrical shape extending across the central line with a length spanning inside the upper surface area of the insert.

According to another feature of the present invention, the protuberance extends in a direction perpendicular to the central line and is separated rearward from the forward protrusion.

According to still another feature of the present invention, the rear contact surface of the rear protrusion is convex curved in the transection cutting through the contact surface as well as in the vertical section passing through the central line.

According to still another feature of the present invention, an outside distal portion of the forward protrusion is chamfered or rounded.

The insert clamp according to the present invention has the following technical effects.

The insert clamp according to the present invention has an effect to prevent wearing at the contact point and provide a durable clamping. Also, the insert clamp of the present invention has an effect that a smooth surface contact between the forward protrusion and inner wall of the insert hole is guaranteed, while the point of action for the transverse clamping force is stably fixed at the middle height of the insert hole. This structure also allows a clearance between an upper rim of the insert hole and a corner of the clamp bottom face so that the clamp and the insert can achieve a snug coupling.

In the present invention, a 'smooth surface contact' is contrasted with a 'point contact' in prior art and here is defined as a surface contact where tangential contact is achieved between two curved surfaces or between a curved surface and a flat surface so that resistance to wearing is enhanced over the point contact.

The clamp of the present invention has an effect to prevent point contacts with displaced contact position so that a smooth surface contact is guaranteed at a fixed position. Especially, an effective counterforce is provided against the force lifting the rear portion of the insert apart from the bottom face of the insert pocket due to a shear force applied on the insert nose. Also, although shear force is mainly applied on one active edge of the two edges adjacent to the nose, an effective counterforce is provided against the tendency of lifting a portion of the insert opposite to the active edge apart from the bottom face of the insert pocket. This effect becomes more pronounced if the insert is in triangular shape for which there is only one upstanding support surface in the insert pocket.

In the insert clamp according to the present invention, the rear contact surface and the two protuberances on the bottom face constitute a strong and stable support structure, so-called 'triangular support structure.' Especially, this 'triangular support structure' provides an effect to guarantee a stable and durable clamping state even for cases where two corresponding contact portions are not symmetric and the two contact portions are rather imbalanced in their heights.

Since this 'triangular support structure' is also constituted among the protuberance of the forward protrusion and the two protuberances on the bottom face, the insert clamp in accordance with the present invention has an effect to provide a durable and stable clamping structure with no mobility over the entire body of the insert clamp.

DETAILED DESCRIPTION

Figure 1:
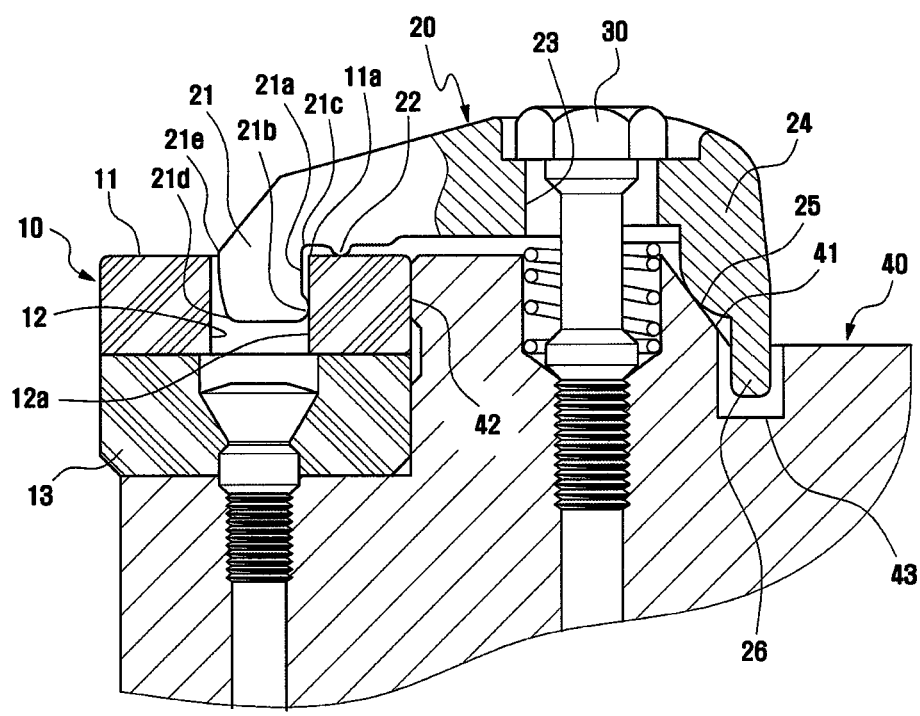
FIG. 1 is a sectional view depicting a tool holder assembly using an insert clamp in accordance with the present invention.

FIG. 1 is a sectional view depicting a tool holder assembly using an insert clamp in accordance with the present invention. And FIGS. 2 to 5 illustrate embodiments of the insert clamps in accordance with the present invention in plane or perspective views.

As shown in FIG. 1, the insert clamp 20 of the present invention is used to secure a cutting insert 10, which has a central hole 12 with its axis perpendicular to an upper surface 11, to a tool holder 40. The cutting insert 10 may be seated on a shim 13 in the tool holder's insert receiving pocket 42. The insert clamp 20 comprises a forward protrusion 21 to be received in the central hole 12 of the insert 10, a central body portion provided with a pressing part 22 to press down the upper surface 11 of the insert 10 and a screw hole 23 for a clamping screw 30 to pass through, and a rear protrusion 24 having a rear contact surface 25 to come in contact with a rearward slanting surface 41 of the tool holder 40.

The forward protrusion 21 is formed on the forward end of the insert clamp 20, an inside surface 21a of the forward protrusion extends downward in a spaced state apart from the inner wall 12a of the central hole of the insert, and a distal portion of the inside surface of the forward protrusion is provided with a protuberance 21b of convex curved surface to come in tangential contact with the inner wall of the insert.

Here, the forward protrusion 21 is preferably formed substantially in a cylindrical shape extending downward with a diameter less than the inner diameter of the central hole of the insert. The extended length of the forward protrusion 21 is preferably determined such that the protuberance 21b is positioned approximately at the middle height of the central hole 12. This will lead an appropriate positioning of the point of action for the transverse clamping force against the insert. The radius of curvature of the convex curve of the protuberance 21b is preferably made large enough to enable a smooth surface contact to the inner wall 12a of the central hole of the insert.

The inside surface 21a of the forward protrusion, except over the portion of the protuberance 21b, is preferably formed substantially in parallel with the inner wall 12a of the central hole of the insert. On the other hand, the outside surface of the forward protrusion is not necessarily in parallel with the inner wall 12a of the central hole of the insert. The outside surface is preferably rounded as shown in FIG. 1, or the outer portion of the bottom end surface of the forward protrusion 21 is machined to be sloped as shown in FIGS. 2 to 5. These are provided to easily introduce the forward protrusion 21 into the central hole of the insert. In the present invention, the above shapes of the forward protrusion 21 for easy introduction to the central hole are understood as a sort of the chamfering of the outer bottom end 21d of the forward protrusion 21. Anyhow, the foremost end 21e of the forward protrusion 21 is preferably not protruded ahead before the central hole of the insert.

The pressing part 22 in accordance with the present invention is formed on the bottom surface of the central body portion of the insert clamp, and has convex curved surfaces to come in tangential contact with the upper surface of the insert on both regions of the bottom surface of the central body portion which is bisected by a central line passing through the forward protrusion 21 and the screw hole 23.

Figure 2:
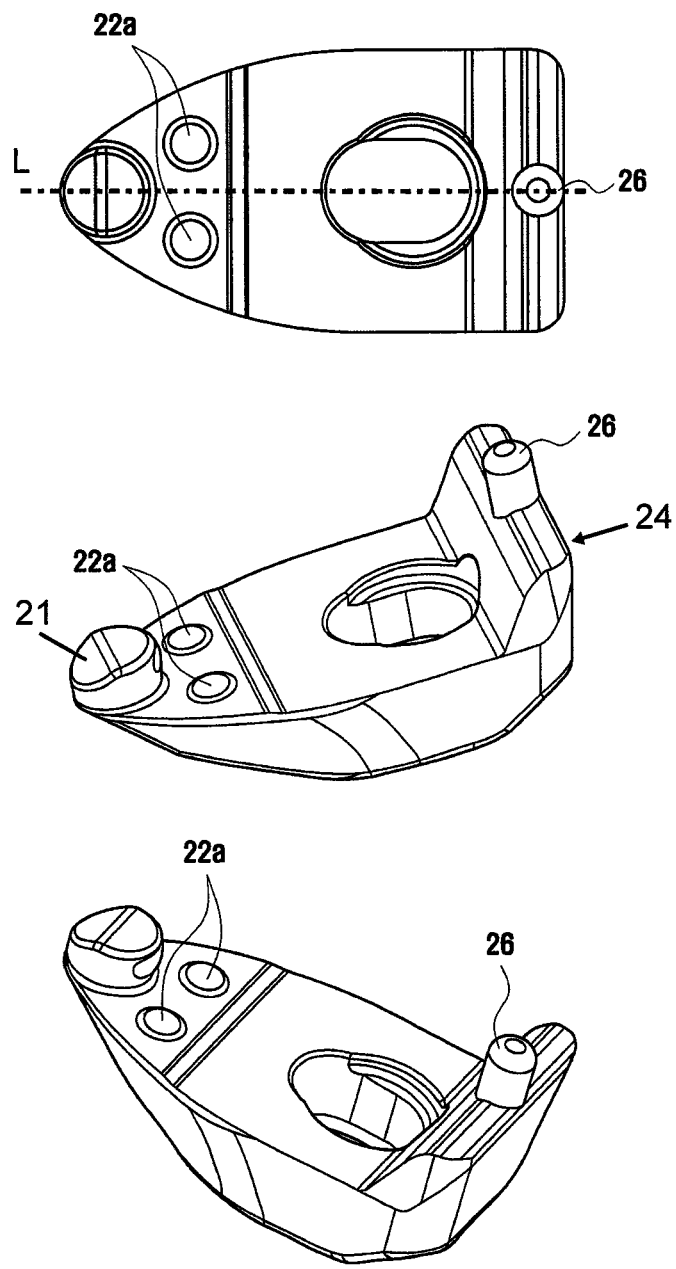
FIGS. 2 to 5 are plane or perspective views illustrating embodiments of the insert clamps in accordance with the present invention.

One embodiment of the pressing part 22, as shown in FIG. 2, is a pair of protuberances 22a in hemispherical shape separated by a length spanning across the central line L inside the upper surface area of the insert. The line joining the pair of protuberances 22a is preferably perpendicular to the central line and is separated rearward from the forward protrusion 21.

Figure 3:
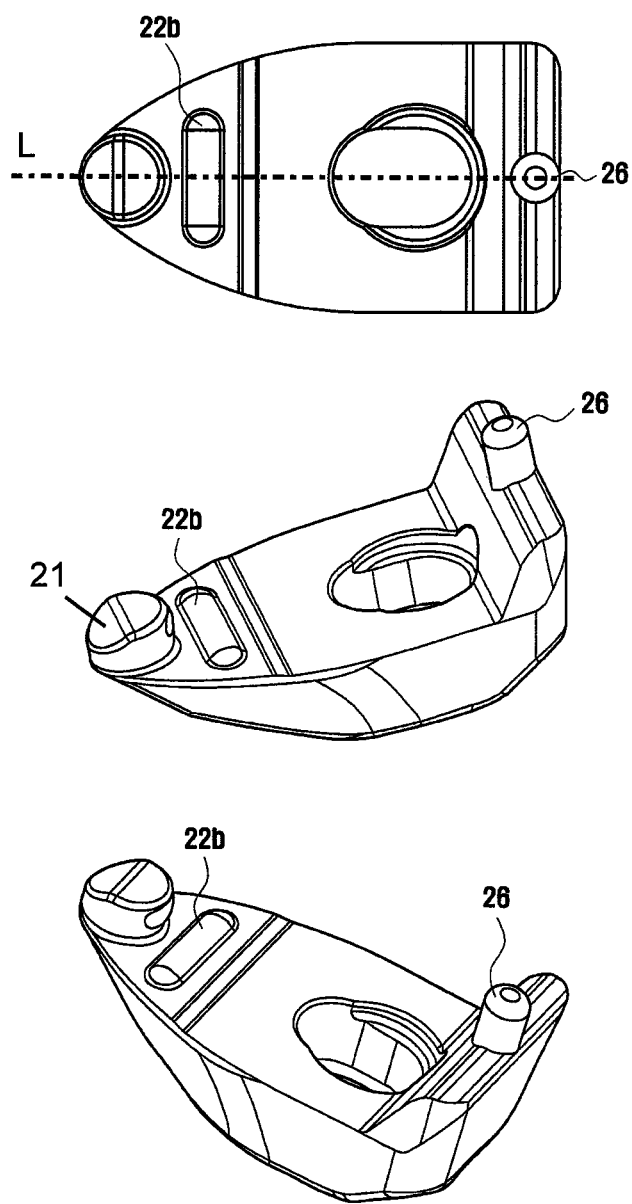

Another embodiment of the pressing part 22, as shown in FIG. 3, is a protuberance 22b in an elongated hemi-cylindrical shape extending across the central line with a length spanning inside the upper surface area of the insert. The protuberance 22b preferably extends in a direction perpendicular to the central line L and is separated rearward from the forward protrusion 21.

The radii of curvature of the convex curves of the protuberances 22a in hemispherical shape and the protuberance 22b in an elongated hemi-cylindrical shape are preferably made large enough to enable a smooth surface contact to the inner wall 12a of the central hole of the insert.

Figure 4:
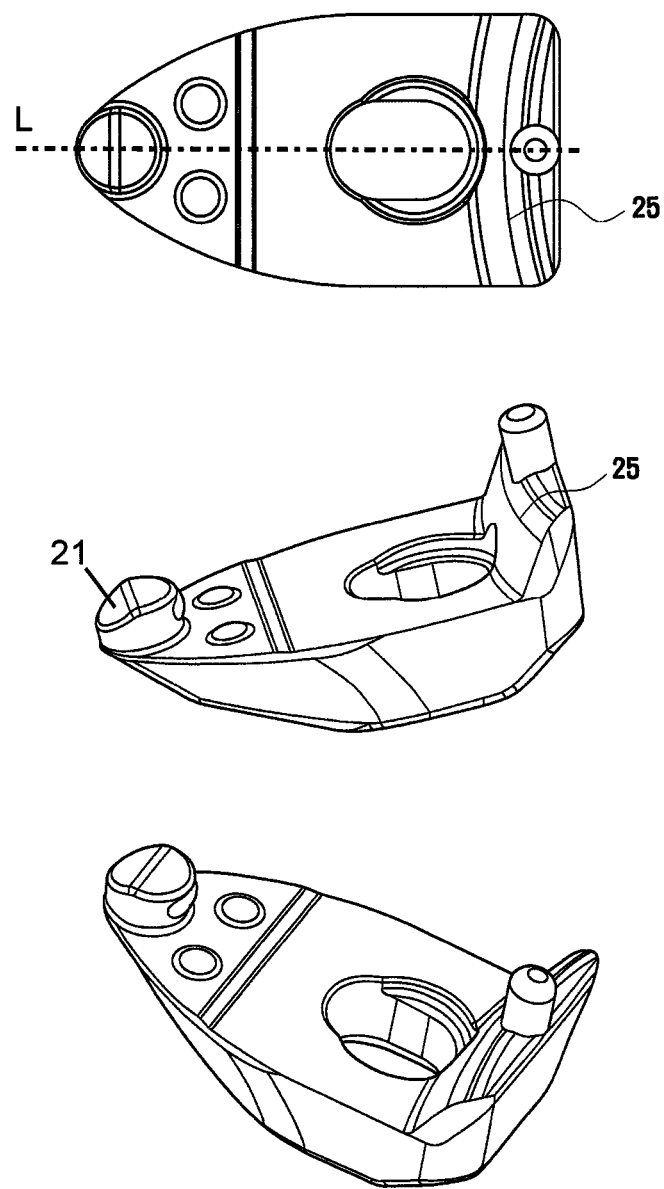
Figure 5:
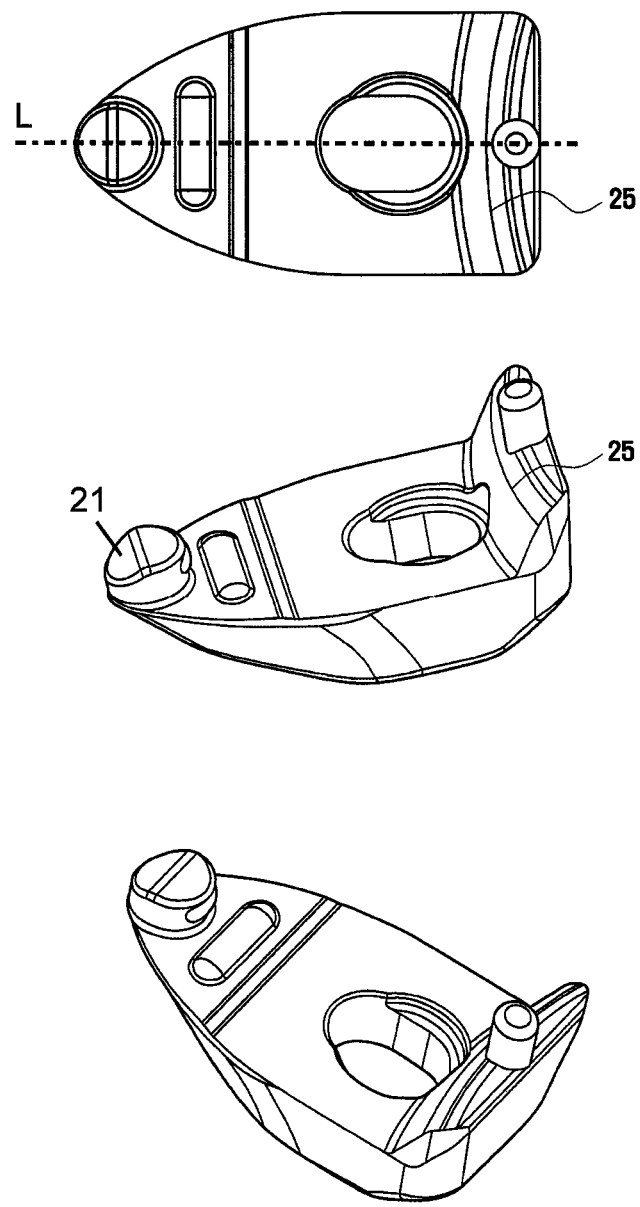

The rear contact surface 25 of the rear protrusion 24 according to the present invention is convex curved in the vertical cross section passing through the central line so that the rear contact surface 25 comes in tangential contact with a rearward slanting surface 41 of the tool holder 40, as can be seen in FIG. 1. It is even more preferable that the rear contact surface 25 of the rear protrusion 24 is convex curved in the transection cutting through the contact surface as well as in the vertical cross section passing through the central line, as can be seen in FIGS. 4 and 5.

On the other hand, an extension pin 26 is formed at the bottom end of the rear protrusion 24 and received in a recess 43 of the tool holder so that the insert clamp 20 does not fall off from its own position even when the clamping screw 20 is not firmly tightened.

The insert clamp according to the present invention has the following technical effects.

Figure 6:
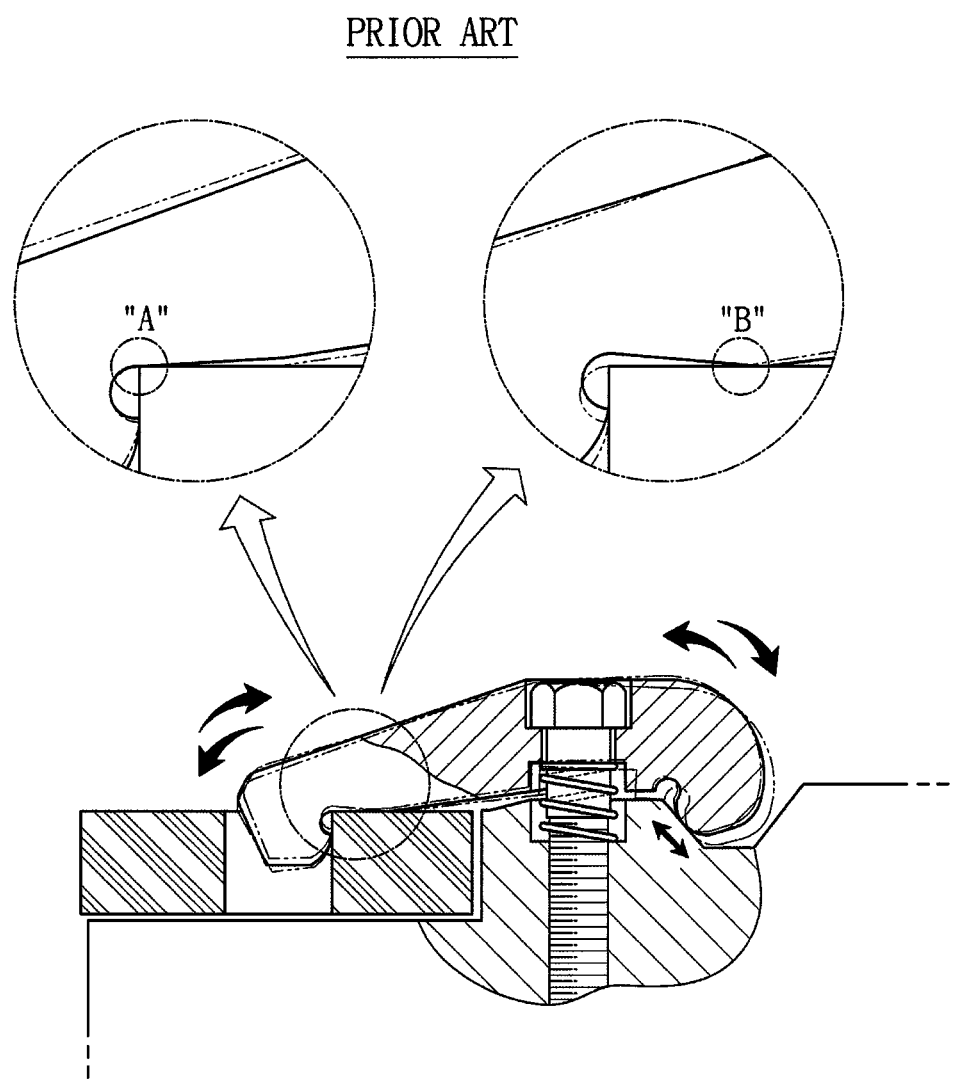
FIGS. 6 and 7 are sectional views depicting related prior art.
Figure 7:
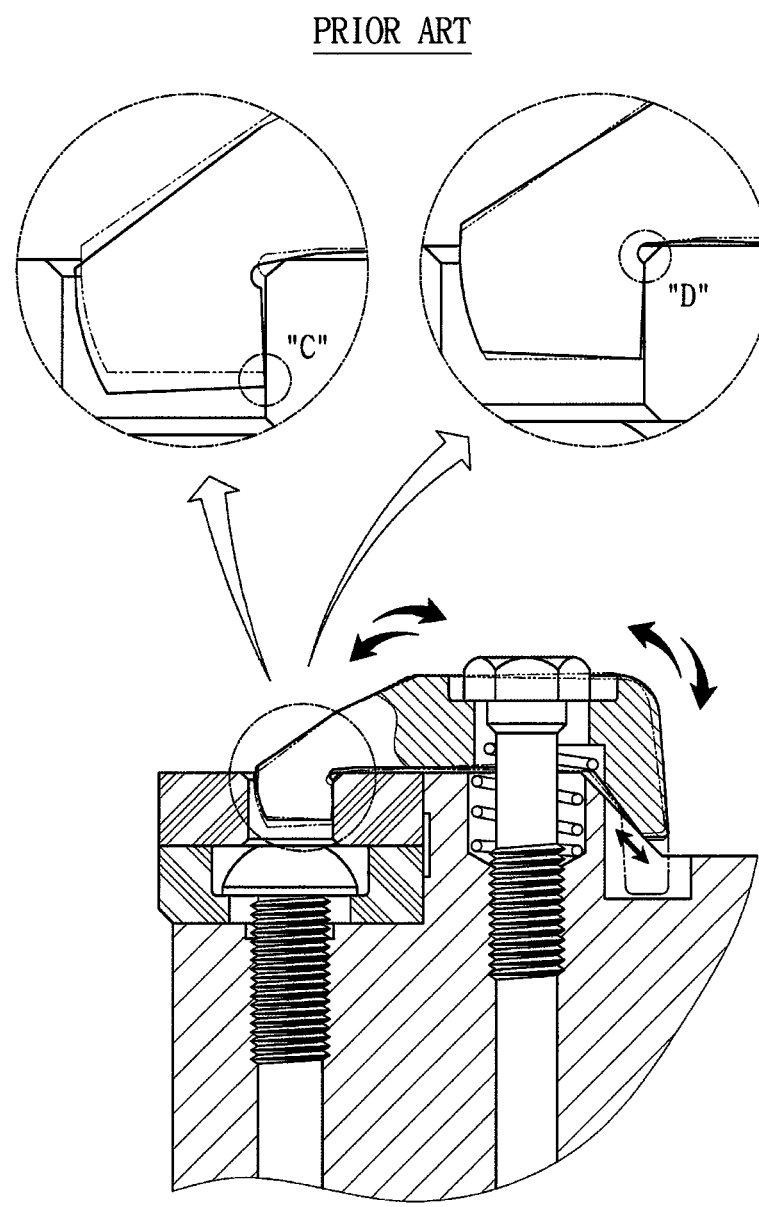

Since a distal portion of the inside surface of the forward protrusion is provided with a protuberance 21b of convex curved surface to come in tangential contact with the inner wall of the insert, the insert clamp according to the present invention has an effect to prevent wearing at the contact point, which may occur in the prior art shown in FIG. 6, and, therefore, to provide a durable clamping. Also, by excluding point contacts with displaced contact either at a lower point (point "C") or a higher point (point "D") as depicted in the prior art of FIG. 7, the insert clamp of the present invention has an effect that a smooth surface contact between the forward protrusion 21 and inner wall 12a of the insert hole is guaranteed, while the point of action for the transverse clamping force is stably fixed at the middle height of the insert hole 12. This structure also allows a clearance between an upper rim 11a of the insert hole 12 and a corner 21c of the clamp bottom face so that the clamp 20 and the insert 10 may achieve a snug coupling.

Since the protuberances 22a, 22b on the bottom surface of the central body portion of the insert clamp has convex curved surfaces to come in tangential contact with the upper surface of the insert, the clamp of the present invention has an effect to prevent displaced point contacts either at a forward position (point "A") or a rearward position (point "B") as depicted in the prior art of FIG. 6 so that a smooth surface contact is guaranteed at a fixed position. Especially, since the smooth surface contact by the protuberances 22a is located in rearward separation from the insert hole wall 12a, an effective counterforce is provided against the force lifting the rear portion of the insert apart from the bottom face of the insert pocket due to a shear force applied on the insert nose. Also, since pressing down forces by tangential contact with the upper surface of the insert are applied on both regions of the bottom surface of the central body portion which is bisected by a central line passing through the forward protrusion 21 and the screw hole 23, although shear force is mainly applied on one active edge of the two edges adjacent to the nose, an effective counterforce is provided against the tendency of lifting a portion of the insert opposite to the active edge apart from the bottom face of the insert pocket. This effect becomes more pronounced if the insert is in triangular shape for which there is only one upstanding support surface in the insert pocket.

In one embodiment of the insert clamp according to the present invention, since the rear contact surface 25 of the rear protrusion 24 is convex curved in the transection cutting through the contact surface as well as in the vertical cross section passing through the central line, the rear contact surface 25 and the rearward slanting surface 41 make a smooth surface contact at a certain position on the central line. Therefore, the rear contact surface 25 and the two protuberances 22a on the bottom face constitute a strong and stable support structure, so-called 'triangular support structure.' Especially, this 'triangular support structure' provides an effect to guarantee a stable and strong clamping state even for cases where two corresponding contact portions are not symmetric with respect to the cross sectional plane of FIG. 1 containing the central line and the two contact portions are rather imbalanced in their heights.

Since this 'triangular support structure' is also constituted among the protuberance 21b of the forward protrusion 21 and the two protuberances 22a on the bottom face, the insert clamp 20 in accordance with the present invention has an effect to provide a durable and stable clamping structure with no mobility over the entire body of the insert clamp.

The effect of 'triangular support structure' is also applicable for an insert clamp having the protuberance 22b in elongated hemi-cylindrical shape.

The present invention is applicable for the industrial field of cutting tool holder assemblies.

The invention claimed is:

1. An insert clamp for securing a cutting insert to a tool holder, the cutting insert having a central hole with its axis perpendicular to an upper surface, comprising:
 a forward protrusion to be received in the central hole of the insert,
 a central body portion provided with a pressing part to press down the upper surface of the insert and a screw hole for a clamping screw to pass through, and
 a rear protrusion having a rear contact surface to come in contact with a rearward slanting surface of the tool holder;
 wherein:
 the forward protrusion is formed on the forward end of the insert clamp, an inside surface of the forward protrusion extends downward in a spaced state apart from the inner wall of the central hole of the insert, and a distal portion of the inside surface of the forward protrusion is provided with a protuberance of convex curved surface to come in tangential contact with the inner wall of the insert; and
 the pressing part is formed on the bottom surface of the central body portion of the insert clamp, and has convex curved surfaces to come in tangential contact with the upper surface of the insert on both regions of the bottom surface of the central body portion which is bisected by a central line (L) passing through the forward protrusion and the screw hole.

2. The insert clamp according to claim 1, wherein the pressing part is a pair of protuberances in hemispherical shape separated by a length spanning across the central line (L) inside the upper surface area of the insert.

3. The insert clamp according to claim 2, wherein a line joining the pair of protuberances is perpendicular to the central line (L) and is separated rearward from the forward protrusion.

4. The insert clamp according to claim 1, wherein the pressing part is a protuberance in an elongated hemi-cylindrical shape extending across the central line (L) with a length spanning inside the upper surface area of the insert.

5. The insert clamp according to claim 4, wherein the protuberance extends in a direction perpendicular to the central line (L) and is separated rearward from the forward protrusion.

6. The insert clamp according to claim 1, wherein:

the rear contact surface of the rear protrusion is convex curved in a transection cutting through the contact surface as well as in the vertical cross section passing through the central line (L).

7. The insert clamp according to claim 1, wherein:

an outside distal portion of the forward protrusion is chamfered or rounded.

8. A tool holder assembly comprising:

a tool holder having an insert receiving pocket;

a cutting insert seated in the insert receiving pocket; and an insert clamp retaining the cutting insert in the insert receiving pocket, wherein:

the insert clamp is in accordance claim 1.

* * * * *